United States Patent [19]

Lewis, Jr. et al.

[11] 4,165,096

[45] Aug. 21, 1979

[54] STORABLE UTILITY TRAILER

[76] Inventors: Thomas J. Lewis, Jr., 3085 E. Shadowlawn Ave., Atlanta, Ga. 30305; Lester S. Hardwick, 400 Fulton Federal Bldg., Atlanta, Ga. 30303

[21] Appl. No.: 888,235

[22] Filed: Mar. 20, 1978

[51] Int. Cl.² .............................................. B62D 21/18
[52] U.S. Cl. ..................................... 280/641; 280/43; 280/43.24
[58] Field of Search ................ 280/37, 38, 641, 43.24, 280/43, 47, 43.17, 43.18, 401, 491

[56] References Cited

U.S. PATENT DOCUMENTS

| | | | |
|---|---|---|---|
| 1,715,865 | 6/1929 | Rosenfeld | 280/37 |
| 2,110,944 | 3/1938 | Schultz | 280/401 |
| 2,328,138 | 8/1943 | Gosser | 280/401 |
| 2,456,932 | 12/1948 | Dostal | 280/37 |
| 2,549,018 | 4/1951 | Sarlo | 296/26 |
| 2,604,333 | 7/1952 | Elmer | 280/37 |
| 2,876,466 | 3/1959 | Baldwin | 280/43.17 |
| 3,443,268 | 5/1969 | Syms | 280/14 |
| 3,784,230 | 1/1974 | Worrall, Jr. | 280/491 |
| 3,989,264 | 11/1976 | Lovendahl | 280/401 |

*Primary Examiner*—Robert R. Song
*Attorney, Agent, or Firm*—Jones, Thomas & Askew

[57] ABSTRACT

A foldable, storable utility trailer, said trailer having a pair of retractable wheels, a foldable tow bar, and a removable cover which also serves as a storage receptacle when the trailer is not in use. The trailer is constructed in a simple manner so as to provide compactness, ease of operation, and reliability.

7 Claims, 6 Drawing Figures

STORABLE UTILITY TRAILER

This invention relates to a foldable storable utility trailer designed principally for, but not limited to, use with compact cars.

Various attempts have been made to provide a general purpose utility trailer for towing behind an automobile. However, these previous trailers were often characterized by complex, bulky, heavy construction. As a result, some of these trailers were unsuitable for use with less powerful compact cars. Others, which were of lighter weight construction, still had a problem of complex construction and bulkiness. Furthermore, when the utility trailers of the prior art were not in use, such trailers were often difficult to store due to their size.

Accordingly, it is an object of the present invention to provide an improved utility trailer.

It is another object of the present invention to provide a utility trailer that is of simple, lightweight construction so as to be suitable for use with compact cars.

Another object of the present invention is to provide a utility trailer which has retractable wheels and a foldable tongue and hitch so as to make the trailer compact for storage purposes when in its collapsed configuration.

A further object of the present invention is to provide a utility trailer which is simple and easy to convert from its collapsed to its operational configuration.

It is yet another object of the present invention to provide a utility trailer which has a removable cover section which also serves as a storage receptacle for the trailer in its collapsed configuration.

These and other objects, features and advantages will become apparent upon a review of the following detailed description of the present invention and the accompanying drawing.

DETAILED DESCRIPTION OF THE INVENTION

Figure 1:
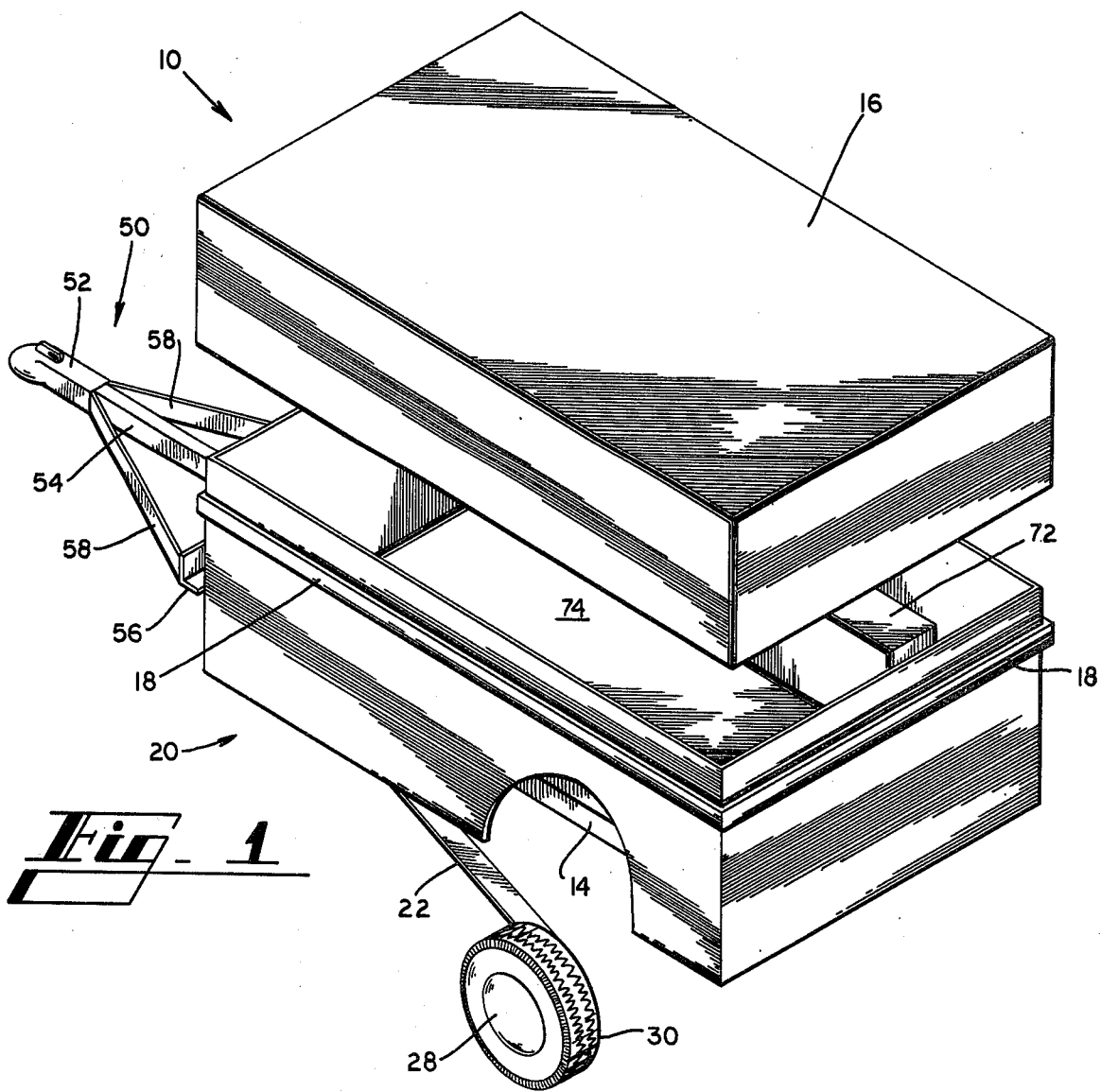
FIG. 1 is a pictorial view of the disclosed embodiment of a trailer according to the present invention. The cover is shown separated from the body of the trailer for illustration purposes so as to reveal the inside compartment of the trailer.

Referring now to the drawing in which like numbers indicate like parts, it will be seen that there is a trailer 10 having a body 12 mounted on a rectangular frame assembly 14. A cover 16 of slightly larger dimensions than the body 12 is provided to fit over the top of the body 12 of the trailer so as to protect objects being hauled in the trailer from the elements. A cover retaining bar 18 is provided around the outside of the body 12 to prevent the cover 16 from sliding down over the outside of the body 12. In this manner a larger usable volume is provided in the trailer compartment 20 then would be possible if a flat cover were used.

Figure 5:
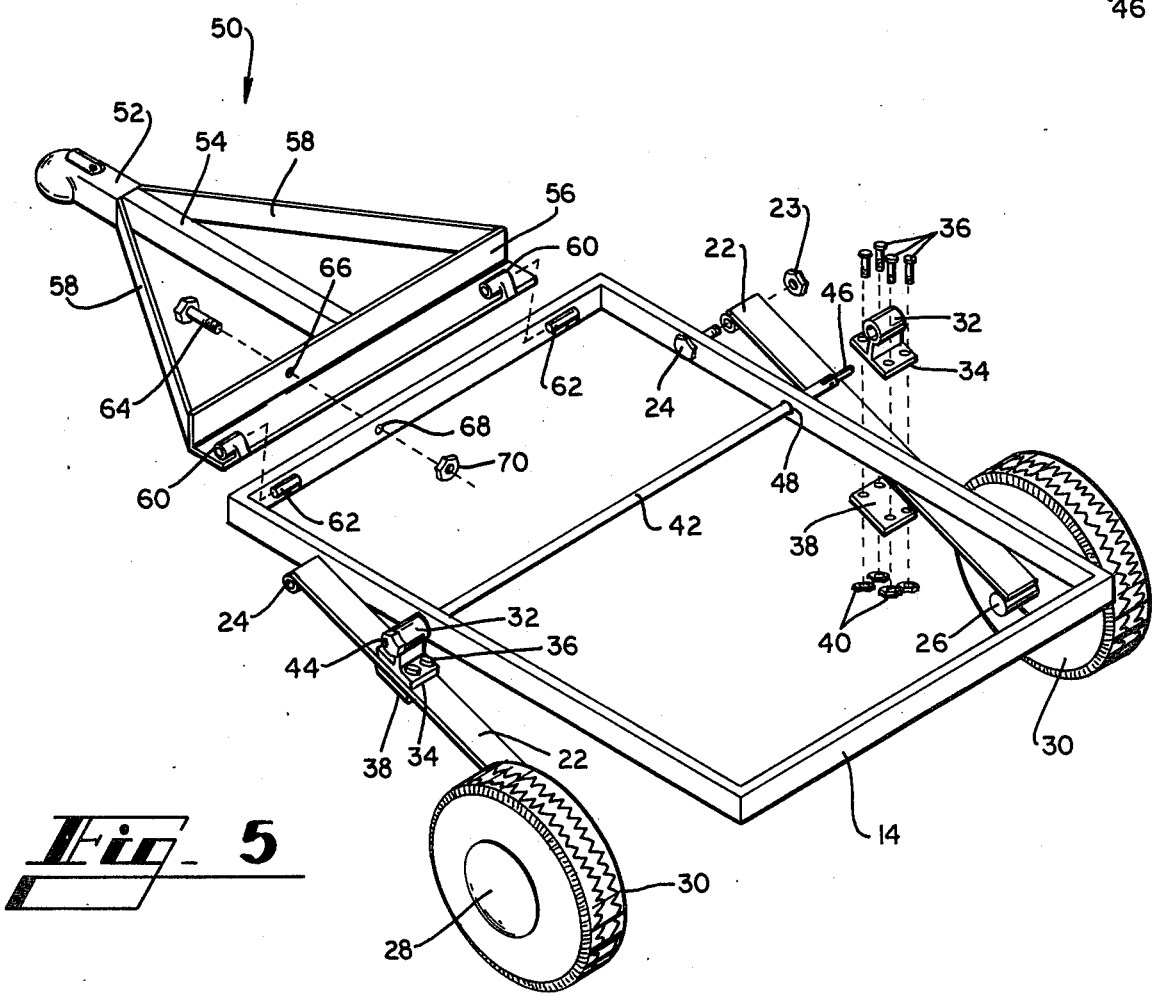
FIG. 5 is a detailed view of the frame, tongue and wheel assembly of the trailer shown in FIG. 1.

Pivotally mounted to the frame assembly 14 are two leaf springs 22 which are held in place by a pivot nut 23 and bolt 24, as best shown in FIG. 5. In the other end of each leaf spring 22 is a wheel axle 26 on which is rotatably mounted a conventional wheel 28 and tire 30.

Attached to each leaf spring 22 at a point between the pivot bolt 24 and the wheel 28 is a collar 32 and bracket 34. The brackets 34 may be mounted to the leaf springs 22 by any suitable means, for example, by bolts 36, base plates 38 and nuts 40. In order to secure the wheels in the down position, a leaf spring locking bolt 42 (FIG. 6) having a head 44 at one end and a locking pin 46 pivotally mounted within a longitudinal slot at the other end of the bolt is passed through one of the collars 32 mounted on one of the leaf springs 22, through holes 48 provided in each side member of the frame assembly 14 and then through the other collar 32 of the other leaf spring 22. The locking pin 46, which was oriented with its longitudinal axis in common with the longitudinal axis of the spring leaf locking bolt 42 in order that the bolt 42 might pass through the collars 32 and holes 48 in the frame assembly 14, is then rotated so that its longitudinal axis is perpendicular to the longitudinal axis of the locking bolt 42. When the locking pin 46 is in this position, it prevents the locking bolt 42 from sliding out of the collars 32 and holes 48, which might otherwise occur as a result of vibration. It will readily be seen that this arrangement of collars and a locking bolt provides an uncomplicated easy to operate means for quickly orienting the wheels in their normal operating position.

Extending from the front of the trailer 10 is the tongue 50 which connects the trailer to a car for towing. The tongue 50 consists of a conventional ball hitch receptacle 52 attached to the tow bar 54 which is attached to the angle bracket 56. Reinforcing side struts 58 are provided to give extra strength and rigidity to the tongue 50.

Attached to the angle bracket 56 are two pivot collars 60. The pivot collars 60 are designed to slip over the pivot pins 62 which are attached to the front member of the frame assembly 14. When the tongue 50 is in place with the pivot collars 60 over the pivot pins 62, the tongue 50 is free to swing from a position within the frame assembly 14 to a position extending forward and outward from the frame assembly 14. When thusly extending in the forward position as shown in FIG. 5, the tongue is secured in place with a bolt 64, which is inserted through hole 66 in the angle bracket 56 and the hole 68 in the front member of the frame assembly 14, and a nut 70. It should be noted that the bolt 64 does not bear the weight of the trailer 10. It is provided merely to prevent the pivot collars 60 from slipping sideways off the pivot pins 62. It is the pivot collars 60 and pivot pins 62 which are subject to the weight of the trailer 10 and accordingly should be made of sufficient strength to sustain the supporting and towing forces of the trailer and its load.

With the tongue 50 locked in its forward extending position and the wheels 28 locked in their down position, the trailer 10 is ready for use. The ball hitch receptable 52 is merely attached to a conventional ball hitch mounted on the rear of a car or truck or other similar vehicle. The trailer 10 may be operated as an open trailer with the cover 16 removed or as a covered trailer with the cover 16 in place. When operated as a covered trailer, suitable means may be provided to secure the cover 16 to the body 12 of the trailer 10.

Figure 2:
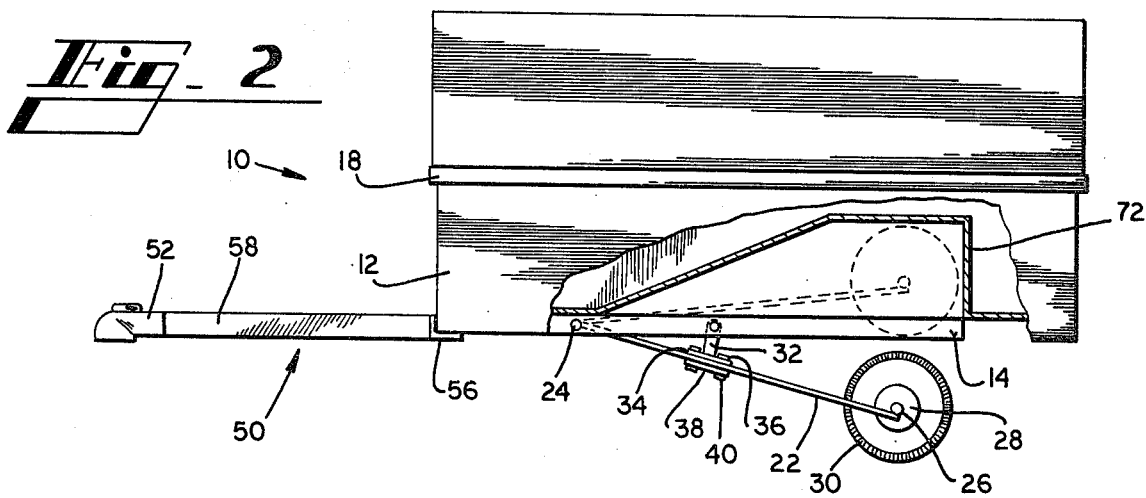
FIG. 2 is a partial cutaway side view of the trailer shown in FIG. 1 with the cover in place.

When it is desired to store the trailer 10, it is equally as simple. The cover 16 is first removed, inverted and placed on the ground. The nut 70 and bolt 64 are removed and the tongue 50 is either swiveled to its storage position within the frame assembly 14 or removed completely by sliding the tongue sideways to remove the pivot collars 60 from the pivot pins 62. The locking pin 42 is unlocked and the leaf spring locking bolt 42 is withdrawn from the collars 32 and holes 48 in the frame assembly. This permits the wheels to be retracted into their raised position within the wheel well housings 72. The spring leaf locking bolt 42 is then reinserted into the holes 48 in the frame assembly 14 and again locked into place with the locking pin 46. The ends of the locking bolt 42 which project out of the frame assembly 14 extend below the spring leaves 22 and thereby provide supports for the spring leaves 22 so as to maintain the wheels in the raised position during storage, as shown in phantom in FIG. 2. It should be noted that the dimensions of the tire 30, the wheel well housing 72 and the position of the spring leaf locking bolt 42 are arranged so that when the wheels are in the raised position, they fit flush with the bottom of the bed 74 of the trailer 10.

Figure 3:
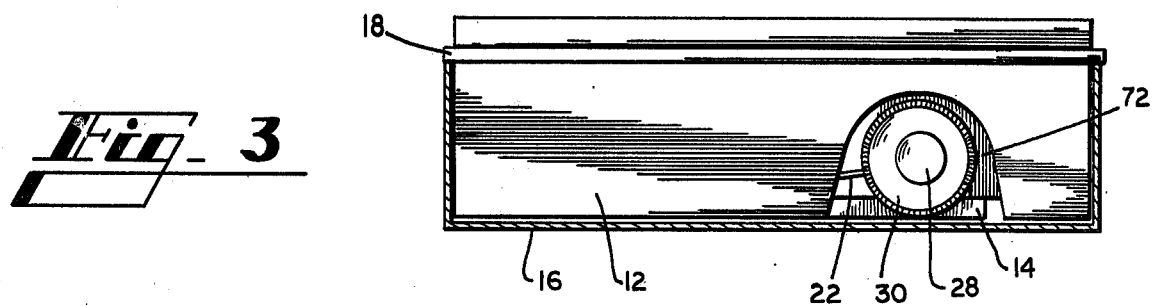
FIG. 3 is a partial cutaway side view of the trailer of FIG. 1, shown in its collapsed configuration ready for storage.
Figure 4:
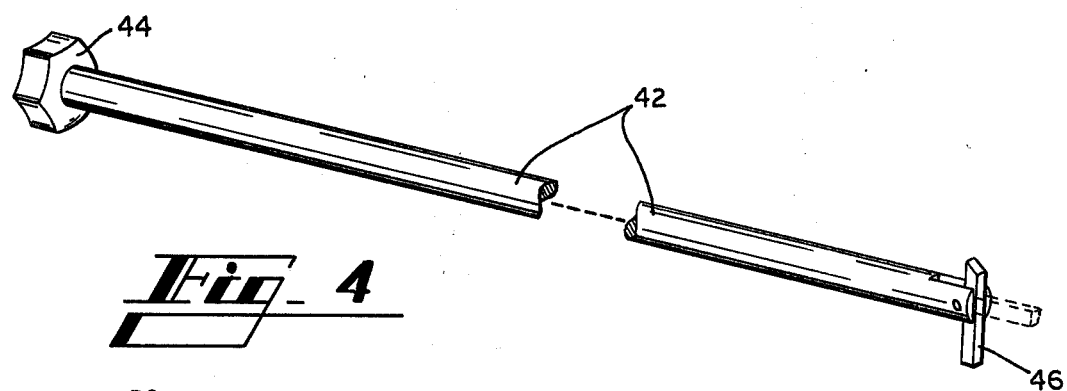
FIG. 4 is a detailed view of the center leaf spring support bolt.

After the tongue 50 has been folded under and the wheels have been raised, the body 12 of the trailer 10 may be placed inside the inverted cover 16 as shown in FIG. 3. The cover 16, therefore, serves to protect the wheels and tonge 50 from damage and also catches grease or fluids which might drip from the wheels. When in this configuration, it will be seen that the trailer 10 is a very compact size occupying approximately one-half the volume and floor space of the operational configuration. It would thus be easily stored either flat, on its edge or on its end in any relatively small space.

The trailer may again be readied for use by removing the body 12 from the cover 16, removing the locking bolt 42, lowering the wheels, reinserting and locking the locking bolt 42, swiveling the tongue 50 into the forward extending position, reinserting the bolt 64, and replacing the cover 12. Therefore, it will be seen that the trailer may be quickly and easily converted from storage to operation to storage without complicated parts or procedures.

The utility trailer may be constructed out of any suitable material that has sufficient strength and rigidity, but preferably the materials selected should be chosen for a lightweight construction. Such suitable materials include plastic or fiberglass for the body and cover of the trailer and lightweight channel iron or aluminum for the tongue and frame assembly.

When constructed in accordance with the present invention the utility trailer's compact size and light weight also make it suitable for use as a hand drawn vehicle, such as a wheelbarrow.

Figure 6:
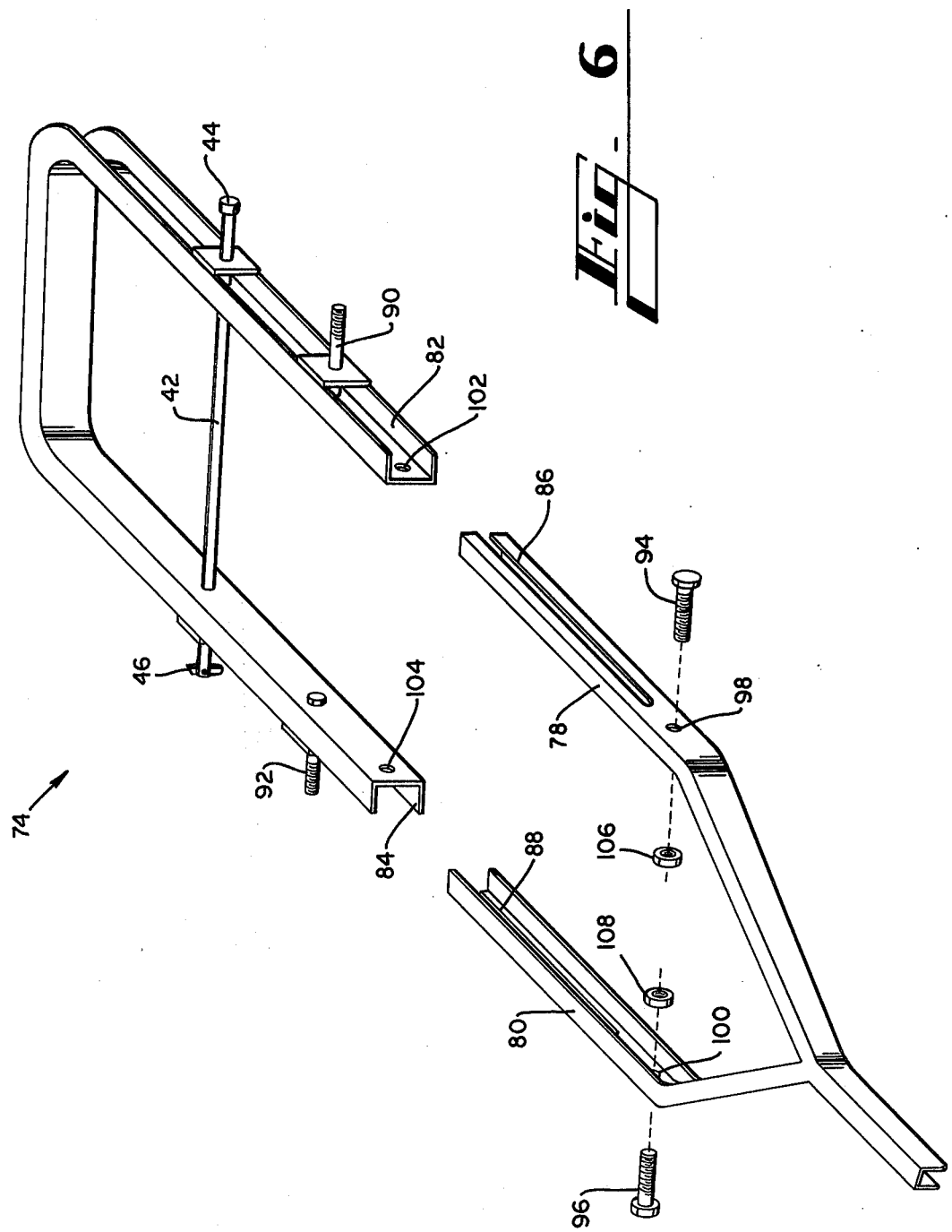
FIG. 6 is a detailed view of the frame and tongue assembly of an alternate disclosed embodiment of the trailer of the present invention.

In an alternative embodiment of the present invention, the frame assembly and tongue are constructed as shown in FIG. 6. The assembly consists of a U-shaped piece 74 and a Y-shaped piece 76 both constructed from channel iron or other similar material. The Y-shaped piece 76 forms the tongue apparatus and the front portion of the frame assembly while the U-shaped piece 74 forms the rear portion of the frame assembly.

The two pieces 74 and 76 are joined together by sliding the springs 78 and 80 of piece 76 into the channels 82 and 84 of piece 74. Guide slots 86 and 88 in the prongs 78 and 80 slide over guide pins 90 and 92 and leaf spring locking bolt 42 which are mounted on piece 74. When in place, bolts 94 and 96 are inserted in holes 98 and 100 of piece 76 and holes 102 and 104 of piece 74 and secured in place with nuts 106 and 108. Thus, it will be seen that this construction provides a simplified tongue and frame assembly for use with the utility trailer of the present invention.

It should be understood that the previously described embodiments merely illustrate principles of the invention in selected, preferred form. Many modifications, additions and deletions may, of course, be made thereto without departing from the spirit and scope of the invention as set forth in the following claims.

What is claimed is:

1. Foldable utility trailer apparatus comprising:
   body means defining an upwardly extending open area for receiving a load;
   means located beneath said load receiving area for defining a pair of wheel receiving receptacles;
   means mounted beneath said body means for supporting a pair of wheels either in lowered position in which said wheels are upright and engage the ground for traveling support of said body means, or in a raised position in which said wheels remain upright and occupy said wheel receptacles, thereby lowering the overall height of said trailer apparatus;
   cover means configured to fit over said upwardly extending open area of said body means, so as to enclose loads received therein; and wherein
   the underside of said body means is configured to fit within said cover means when said wheels are in said raised position, so that said trailer apparatus can be stored with the underside thereof enclosed by said cover means when not in use.

2. Trailer apparatus as in claim 1, further comprising tongue means removably mounted to said body means for attaching said trailer apparatus to a vehicle for the purpose of towing said trailer apparatus.

3. Trailer apparatus as in claim 2 wherin said tongue means comprises:
   hitch means;
   tow bar means attached to said hitch means; and
   hinge means attaching said tow bar means to said body means so that said tow bar when not in use can be folded so as to reduce the overall length of said trailer apparatus.

4. Trailer apparatus as in claim 2 wherein said tongue means comprises:
   tow bar means slidably engageable with said body means and selectively removable therefrom for storage; and
   hitch means attached to said tow bar means.

5. Trailer apparatus as in claim 3 further comprising locking means for locking said tongue means in an outwardly and forwardly extending position from said body means.

6. Trailer apparatus as in claim 3 wherein said hinge means comprises:
   pin means attached to said two bar means; and
   collar means attached to said body means for slidable and rotatable engagement with said pin means so that said tow bar can either be folded or can be removed by disengaging said pin means from said collar means.

7. Foldable utility trailer apparatus comprising:

body means defining an upwardly extending open area for receiving a load;

means located beneath said load receiving area for defining a pair of wheel receiving receptacles; and means mounted beneath said body means for supporting a pair of wheels either in lowered position in which said wheels are upright and engage the ground for traveling support of said body means, or in a raised position in which said wheels remain upright and occupy said wheel receptacles, thereby lowering the overall height of said trailer apparatus;

said means mounted beneath said body means comprising leaf spring means having one end rotatably attached to said body means and the other end rotatably attached to said wheels;

collar means attached to said leaf spring means;

pin means which removably engages said collar means and said body means, thereby locking said wheels in said lowered position when thusly engaged; and said pin means further provides support for said leaf spring means and thereby maintains said wheels in said raised position when otherwise engaging said body means only.

* * * * *